United States Patent

[11] 3,624,119

| [72] | Inventors | Wilfried Rothe<br>Strotzbach;<br>Hans Pfleger, Neu-Isenberg, both of<br>Germany |
| --- | --- | --- |
| [21] | Appl. No. | 829,035 |
| [22] | Filed | May 29, 1969<br>Continuation-in-part of Ser. No. 803,125,<br>Feb. 7, 1969, abandoned |
| [45] | Patented | Nov. 30, 1971 |
| [73] | Assignee | Deutsche Gold-Und Silber-Scheideanstalt<br>Vormals Roessler<br>Frankfurt am Main, Germany |
| [32] | Priority | Feb. 9, 1968 |
| [33] | | Germany |
| [31] | | P 16 43 926.2 |

[54] PROCESS OF MAKING ALKYLTRIHALOGENOSILANES
7 Claims, 1 Drawing Fig.

[52] U.S. Cl. ................................................ 260/448.2
E, 252/429 R
[51] Int. Cl. ........................................................ B01j 11/64,
C07f 7/02
[50] Field of Search ............................................ 260/448.2
E, 429 J; 252/429 R

[56] References Cited
UNITED STATES PATENTS

| 2,721,873 | 10/1955 | MacKenzie et al. | 260/448.2 |
| 2,823,218 | 2/1958 | Speier et al. | 260/448.2 |
| 3,153,662 | 10/1964 | Pike | 260/448.2 |

Primary Examiner—Tobias E. Levow
Assistant Examiner—Werten F. W. Bellamy
Attorney—Michael S. Striker ABSTRACT: Alkyltrihalogenosilanes are made by reacting a trihalogenosilane with a gaseous olefin at a temperature between 30° and 150° C. and normal pressure in the presence of a platinum metal catalyst.

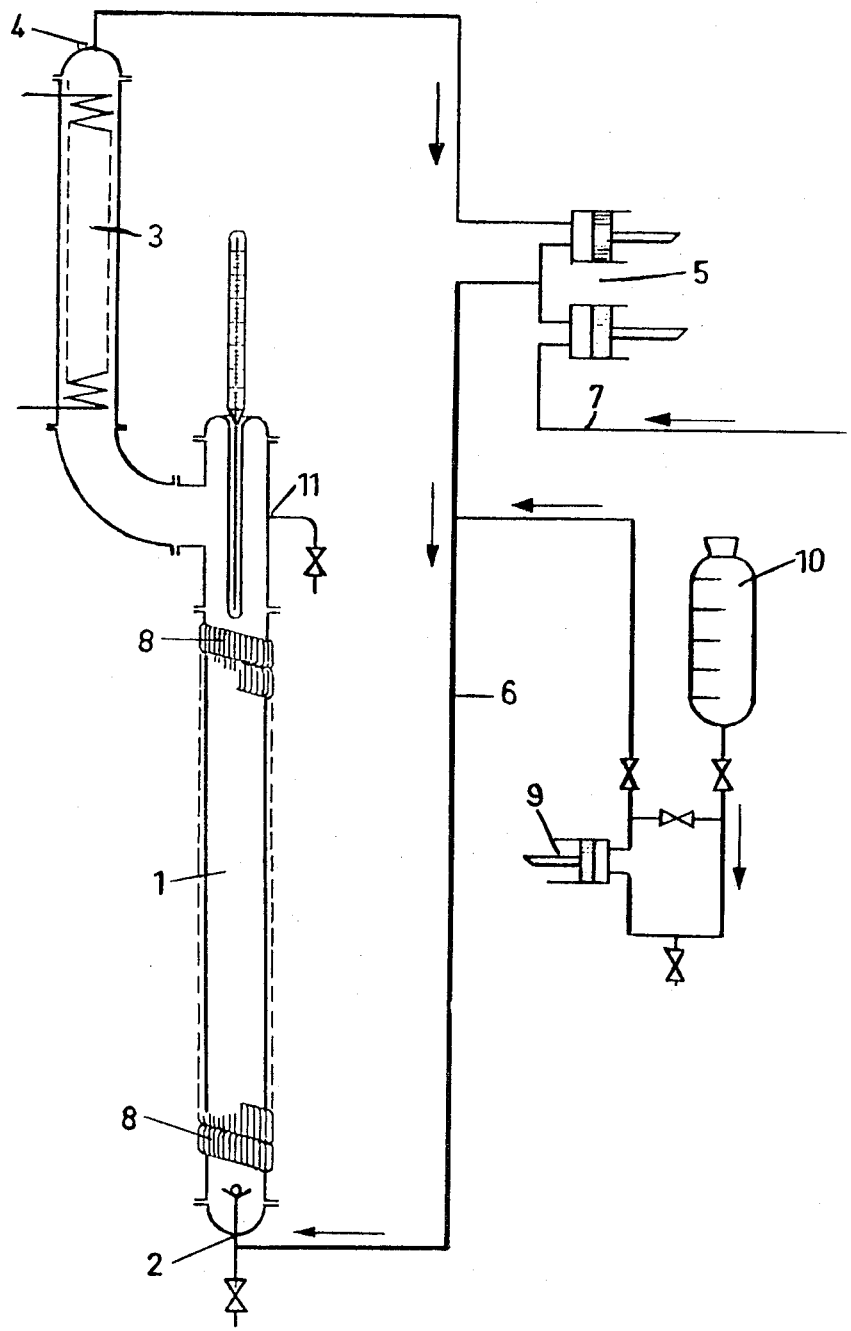

PROCESS OF MAKING ALKYLTRIHALOGENOSILANES

This application is a continuation in part of application Ser. No. 803,125, filed by the same inventors on Feb. 7, 1969, and now abandoned in respect of "Process of Making Alkyl-trihalogenosilanes" and assigned to the same assignee.

BACKGROUND OF THE INVENTION

The invention relates to a process for making alkyl-trihalogenosilanes, particularly propyl- and butyl-trihalogenosilanes, particularly propyl- and butyl-trihalogenosilanes, by reaction of the corresponding olefins with trihalogenosilanes.

Alkyltrihalogenosilanes have more recently been produced by reacting trihalogenosilanes with hydrocarbons of the $C_2$ to $C_{10}$ series. Preferred in the prior art procedures as hydrocarbons are in this case olefins, and the reactions may, for instance, be effected in the presence of copper. However with all prior art processes of this type it was necessary to carry out the reaction under pressure.

In other prior art processes, alkyltrihalogenosilanes are formed by reacting alkyl chlorides with dichloropolysilanes (hexachlorodisilane) or with trichlorosilane in the presence of copper, mercury, antimony or nickel catalysts. The application of pressure was necessary also in these processes. The time of reaction, for instance, to produce octyltrichlorsilane was at least 5 hours.

The thermal and possibly catalytic pressure reactions resulted in almost all cases in mixtures of different organosilanes which had to be separated by distillation into the individual components or mixtures of different components. With the use of this type of process for instance for making propyltrichlorosilane, the maximum yield was about 68 percent, and this after application of a temperature of 200° C., a pressure of 70 atmospheres above atmospheric, and a reaction time of 25 hours.

The shortcomings of these prior art procedures were found in the first place in the pressure requirements, which always required special technical equipment, and on the other hand in the overlong reaction time, for instance for making propyl- or butyl- trihalogenosilanes.

Previous attempts to use platinum metal on carriers or chloroplatinic acid (platinum chloride) in the reaction of liquid alkyl- or alkenyl- chlorides with compounds containing silyl groups such as $HSiCl_3$ have resulted only in mixtures of organohalogenosilanes and have therefore not been very useful for industrial purposes.

It is therefore an object of the present invention to provide a process of making alkyltrihalogenosilanes, particularly propyl- and butyl- trihalogenosilanes, which avoids the shortcomings of the prior art processes, and in particular avoids the pressure requirement and permits to obtain almost quantitative yields in short reaction times.

SUMMARY OF THE INVENTION

The essence of the invention is the reaction of trihalogenosilanes with gaseous olefins at a temperature between 30° and 150° C. and normal pressure in the presence of a platinum metal catalyst. The platinum metal catalyst may also be formed by a platinum compound and may be used on a carrier material.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The drawing illustrates in diagrammatic form an apparatus for practicing the process of the invention.

DESCRIPTION OF THE PREFERRED EMBODIMENTS

The preferred silane for the reaction of the invention is the trichlorosilane.

The platinum is used in catalytic amounts.

The term "platinum metal catalyst" as used in this specification and in the claims attached hereto shall include platinum and platinum compounds. The platinum material may be employed, for instance, on active carbon or it may be employed in the form of a compound such as an inorganic salt like $H_2PtCl_6$ or also as an organic complex. The catalyst may be applied on a carrier as already indicated or in a suspension or a true solution.

The preferred catalyst is $H_2PtCl_6 \cdot 6H_2O$ in solution is isopropanol or a platinum complex of the general formula $PtX_2(RCOCR'COR'')_2$, wherein X is a halogen, R is alkyl, R' is alkyl or hydrogen and R'' is an alkyl- or alkoxy-residue.

With reference to the drawing, drawing, it will be noted that 1 indicates a vertical reaction tube which is in the form of a pulsation column and has a gas inlet 2. The trihalogenosilane is placed in this reaction tube together with the catalyst. At the upper end of the reaction tube there is provided a reflux condenser 3 of which the outlet 4 is connected through a circulation piston pump 5 with a gas inlet 6. The circulation pump for the gas is in addition connected to the olefin reservoir (not shown) containing, for instance, propylene or 1-butylene, by means of a suction duct 7. The reaction chamber or tube 1 is provided with an external infinitely variable electrical heating device 8 or a heating jacket in which a heat-exchange agent circulates.

The operation of the device is as follows:

The reflux commences at about 32° C. in case of $HSiCl_3$ (b.p. 31.8° C.). It is kept going at a vigorous pace and fresh olefin is fed into the pulsating liquid while unreacted olefin is fed into the pulsating liquid while unreacted olefin is recirculated. The reaction commences instantaneously, as appears from the steady increase of the reflux temperature. once the boiling temperature of the alkyltrihalogenosilane has almost been reached, the apparatus is switched over to continuous operation.

Trihalogenosilane is then continuously introduced into the gas inlet tube by means of a distributor or dosing pump 9 and is obtained from a supply vessel 10 while at the top 11 of the reaction tube the final product is withdrawn.

The temperature will remain constant at an hourly increasing throughput up to a limit value which corresponds to the capacity of the column. This limit value also determines the maximum possible charge. The withdrawn final product consists of a high percentage of propyl or butyl trihalogenosilane which is separated by distillation from the catalyst. The catalyst residue can again be used for the reaction, or in case there is a slackening of the reaction, small portions of catalyst may be removed with the final product and may be replenished by fresh catalyst introduced with the $HSiCl_3$.

The technical advance of the process of the invention is in the exceedingly rapid course of the reaction due to the pulsating liquid column. The reaction is at the same time highly selective and leads to almost quantitative yields. The total reaction time thus amounts only to a fraction of the time period necessary heretofore. The reaction besides can easily be carried out in a continuous operation and is particularly desirable from an operational point of view since it proceeds without pressure and without any substantial losses.

The following Examples will illustrate the invention:

EXAMPLE 1

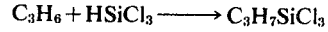

1700 g. $HSiCl_3$ were first reacted with propylene in the presence of 25 ml. of 0.1 m. $H_2PtCl_6 \cdot 6H_2O$ dissolved in isopropanol while circulating so as to form propyltrichlorosilane. The final temperature in the reaction tube was between 110° and 120° C. Subsequently, 1800g./h. $HSiCl_3$ were introduced in a continuous operation and the corresponding amount of reaction product was removed. After a reaction time of 2 hours, 3600 g./h. of final product were subjected to distillation. In the preliminary run at 70° to 122° C. 23 g. were formed, corresponding to 0.64 percent of the theoretical yield. The yield of the pure product in the temperature range of 123–124° was 3430 g.=95.3 percent of the theoretical yield. The distillation residue which was replete with catalyst was recirculated into the reaction tube.

EXAMPLE 2

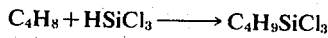

The reaction was carried out as in example 1 with butylene at a final temperature of 145° C. 2500 g. final product were withdrawn and distilled after a continuous operation of 4 hours. In the preliminary run, 61 g.=2.44 percent of the theoretical yield were formed at a boiling temperature up to 147° C. The principal reaction product was butyltrichlorosilane in an amount of 2395 g. corresponding to 95.8 percent of the theoretical yield

EXAMPLE 3

At an hourly rate 11.44 kg. of trichlorosilane and during the same period 8.5 ml. of a propyl alcohol solution of platinum-acetylacetonate were fed in a continuous process into a cylindrical vessel provided with heating equipment. The total platinum content of the catalyst was 282 mg. Thereupon dry propylene was introduced into the reaction vessel and subjected therein to intensive circulation. A spontaneous reaction set in upon formation of propyltrichlorosilane. The temperature then rose to close to the boiling point of the propyltrichlorosilane heating of the vessel and supported also by the liberated heat of reaction. The amount of propylene used up was about 1.9 m.³/h. that is 3.56 kg. In this manner, 15 kg. of reaction product per hour could be discharged from the reaction vessel, either in a continuous process or by batches. After fractional distillation, there were obtained 14.5 kg. of pure proyltrichlorosilane having a boiling point of 123.5° C.

What is claimed as new and desired to be protected by Letters Patent is set forth in the appended

We claim:

1. Process of preparing alkyltrihalogensilanes which comprises reacting a trihalogensilane with a gaseous olefin at a temperature between 30 and 150° C and at normal pressure in the presence of a catalytic amount of a catalyst consisting of a platinum complex of the formula $PtX_2-(RCOCR'COR'')_2$, wherein X is halogen, R is alkyl, R' is alkyl or hydrogen and R'' is alkyl or alkoxy.

2. The process of claim 1 wherein said trihalogenosilane is trichlorosilane.

3. The process of claim 1 wherein said olefin is propylene or 1-butylene.

4. The process of claim 1 wherein said catalyst is employed in the form of a solution or suspension thereof.

5. The process of claim 1 carried out in continuously comprising continuously introducing olefin at or near the bottom of a vertically disposed reaction zone, continuously reacting said olefin in said zone with said halogenosilane in the presence of said platinum catalyst, continuously passing the nonreacted trihalogenosilane and olefin from or close to the top of said reaction zone to a reflux condenser and from there reintroducing said nonreacted components back into the reaction at or close to the bottom of said reaction zone and, continuously and before the reaction temperature reaches the boiling point of the alkyltrihalogensilane formed in said reaction, introducing fresh halogenosilane and olefin at or near the bottom of said reaction zone while withdrawing and recovering formed halogensilane from the top of the said reaction zone.

6. The process of claim 5 wherein said olefin is initially introduced into said reaction zone with a heated mixture of trihalogenosilane and catalyst.

7. The process of claim 5 wherein said catalyst is present in said mixture in the form of its solution.

* * * * *